United States Patent
Kim et al.

(10) Patent No.: US 10,141,713 B2
(45) Date of Patent: Nov. 27, 2018

(54) DEVICE AND METHOD FOR PERFORMING OVERALL FREQUENCY STABILIZATION OF FEMTOSECOND LASER OPTICAL COMB BY USING OPTICAL MODES DIRECTLY EXTRACTED FROM OPTICAL COMB

(71) Applicant: Korea Advanced Institute of Science and Technology, Daejeon (KR)

(72) Inventors: Seung-Woo Kim, Daejeon (KR); Young-Jin Kim, Daejeon (KR); Byung Jae Chun, Daegu (KR); Heesuk Jang, Tongyeong-si (KR); Hyun Jay Kang, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 15/744,921

(22) PCT Filed: Aug. 19, 2015

(86) PCT No.: PCT/KR2015/008628
§ 371 (c)(1),
(2) Date: Jan. 15, 2018

(87) PCT Pub. No.: WO2017/010603
PCT Pub. Date: Jan. 19, 2017

(65) Prior Publication Data
US 2018/0212396 A1 Jul. 26, 2018

(30) Foreign Application Priority Data
Jul. 15, 2015 (KR) .................. 10-2015-0100168

(51) Int. Cl.
*H01S 3/139* (2006.01)
*H01S 3/137* (2006.01)
(Continued)

(52) U.S. Cl.
CPC .......... *H01S 3/137* (2013.01); *H01S 3/06754* (2013.01); *H01S 3/10092* (2013.01);
(Continued)

(58) Field of Classification Search
CPC ........ H01S 3/137; H01S 3/139; H01S 3/1305; H01S 3/1312; H01S 3/1396; H01S 3/2383
See application file for complete search history.

(56) References Cited

U.S. PATENT DOCUMENTS

| 7,809,222 B2 | 10/2010 | Hartl et al. |
| 8,780,948 B2 | 7/2014 | Wilkinson et al. |
| 9,207,121 B2 * | 12/2015 | Adler ...................... G01J 3/021 |

FOREIGN PATENT DOCUMENTS

| JP | 2013171285 A | 9/2013 |
| KR | 1020130007841 A | 1/2013 |

(Continued)

*Primary Examiner* — Michael Carter
(74) *Attorney, Agent, or Firm* — The Webb Law Firm

(57) ABSTRACT

The present invention relates to a device and a method for performing overall frequency stabilization of a femtosecond laser optical comb by using optical modes directly extracted from the optical comb, and more particularly, to a device and a method for performing overall frequency stabilization of a femtosecond laser optical comb by using optical modes directly extracted from the optical comb capable of stabilizing an overall range of frequencies of the femtosecond laser optical comb by using optical modes directly extracted from the optical comb and generating a cw laser and pulse having an excellent frequency stability and linewidth from the stabilized optical comb.

15 Claims, 5 Drawing Sheets

(51) Int. Cl.
  *H01S 3/131* (2006.01)
  *H01S 3/23* (2006.01)
  *H01S 3/067* (2006.01)
  *H01S 3/10* (2006.01)
  *H01S 3/11* (2006.01)
  *H01S 3/13* (2006.01)

(52) U.S. Cl.
  CPC .............. *H01S 3/11* (2013.01); *H01S 3/1305* (2013.01); *H01S 3/1307* (2013.01); *H01S 3/139* (2013.01); *H01S 3/1312* (2013.01); *H01S 3/1396* (2013.01); *H01S 3/23* (2013.01); *H01S 3/2383* (2013.01)

(56) References Cited

FOREIGN PATENT DOCUMENTS

| KR | 1020130015893 A | 2/2013 |
| KR | 101332755 B1 | 11/2013 |
| KR | 1020140059675 A | 5/2014 |

\* cited by examiner

DEVICE AND METHOD FOR PERFORMING OVERALL FREQUENCY STABILIZATION OF FEMTOSECOND LASER OPTICAL COMB BY USING OPTICAL MODES DIRECTLY EXTRACTED FROM OPTICAL COMB

CROSS-REFERENCE TO RELATED APPLICATIONS

This application is the United States national phase of International Application No. PCT/KR2015/008628 filed Aug. 19, 2015, and claims priority to Korean Patent Application No. 10-2015-0100168 filed Jul. 15, 2015, the disclosures of which are hereby incorporated in their entirety by reference.

TECHNICAL FIELD

The present invention relates to a device and a method for performing overall frequency stabilization of a femtosecond laser optical comb by using optical modes directly extracted from the optical comb, and more particularly, to a device and a method for performing overall frequency stabilization of a femtosecond laser optical comb by using optical modes directly extracted from the optical comb capable of stabilizing an overall range of frequencies of the femtosecond laser optical comb by using the optical modes directly extracted from the optical comb and generating a cw (continuous-wave) laser and pulse having an excellent frequency stability and linewidth from the stabilized optical comb.

BACKGROUND ART

A femtosecond laser generally indicates a pulse type laser in which an ultra-short laser pulse having a narrow pulse width of several femtoseconds (1 femtosecond=10 to 15 seconds) to several hundreds of femtoseconds in a time domain is repeatedly generated at a predetermined period. When such a femtosecond laser is observed in a frequency domain, it has a spectrum having a wide spectral width of several tens of nanometers. A large number of optical modes are distributed at regularly spaced frequency intervals in such a spectrum, and such a spectrum having a comb shape is called an optical comb.

A frequency of each of the optical modes constituting such an optical comb may be defined as a combination of two independent parameters, that is, a repetition rate ($f_r$) determined by a length of a resonator and a carrier-envelope offset frequency ($f_0$) determined by a difference between the group velocity and the phase velocity. That is, a frequency $f_i$ of an i-th optical mode is represented as follows.

$$f_i = i f_r + f_0$$

The most general method for stabilizing the frequency of the optical comb is to lock two degrees of freedom (the repetition rate and the carrier-envelope offset frequency) of the optical comb. In stabilizing the repetition rate and the carrier-envelope offset frequency, generally, a physical length, an optical path length, or internal dispersion in the resonator is adjusted. Here, in the case of using the physical length, the optical path length, and dispersion adjusting elements (a piezoelectric actuator, a servomotor, a modulator, a pumping laser, a prism pair, and an element for adjusting the tilt of a mirror) in the resonator, both the repetition rate and the carrier-envelope offset frequency are changed.

As a method for stabilizing the frequency of the optical comb, a method for locking the repetition rate and the carrier-envelope offset frequency, which are the two independent parameters, to a rubidium or cesium atomic clock used as a frequency standard in a radio frequency domain on the basis of a phase-locked loop (PLL) method is widely used. In order to improve the stability in stabilizing the frequency of the optical comb, a method of using a separate external cw laser locked to an optical frequency standard such as an optical atomic clock, absorption lines of atoms and molecules, or a high-finesse cavity instead of a radio frequency standard has been developed, and is disclosed in U.S. Pat. Nos. 7,809,222 and 8,780,948.

In the related art disclosed in the above documents, a reference RF signal may be obtained by using a frequency divider in order to divide a repetition rate frequency in a predetermined integer ratio, and the frequency of the optical comb may be stabilized at a higher precision as compared with a case of using the radio frequency standard by stabilizing the carrier-envelope offset frequency obtained from an f-2f interferometer, and the beat signal between a cw laser and the nearest comb mode to the reference RF signal having a frequency, which is a specific integer ratio of the repetition rate.

However, in such a method, a separate external cw laser is required in order to stabilize the optical comb to the optical frequency standard or the high-finesse cavity. Therefore, a control circuit becomes complicated, and locking characteristics may become bad due to intrinsic noise generated in the external laser.

RELATED ART DOCUMENT

Patent Document

1. U.S. Pat. No. 7,809,222
2. U.S. Pat. No. 8,780,948

DISCLOSURE

Technical Problem

Therefore, an object of the present invention is to alleviate complexity of hardware required for stabilization and improve frequency stability by using a conception of optical frequency generation in implementing a method for performing stabilization of an optical frequency comb of a femtosecond laser.

In addition, an object of the present invention is to provide a device and a method for improving the overall frequency stability of an optical comb by stabilizing optical modes extracted from a femtosecond laser optical comb to the high-finesse cavity or an absorption line of an optical atomic clock. That is, an object of the present invention is to reduce complexity of hardware and improve frequency stability by using optical modes directly extracted from a target optical comb to be stabilized without separately introducing external cw lasers in order to stabilize an overall range of optical frequencies of optical modes constituting a femtosecond laser optical comb.

Further, an object of the present invention is to provide a method for stabilizing an optical comb that may be easily applied to a case of utilizing an absorption line of an optical atomic clock providing a standard optical frequency as a stabilization standard.

Ultimately, an object of the present invention is to generate a cw laser having an excellent linewidth and stability from optical modes additionally extracted from a stabilized optical comb and provide the generated cw laser to various optical measurement fields including optical communication and precise spectroscopy.

Other objects of the present invention may be easily understood through a description for the following exemplary embodiments.

Technical Solution

In one general aspect, a device for performing overall frequency stabilization of a femtosecond laser optical comb by using optical modes directly extracted from the optical comb includes: a femtosecond laser light source including a length adjusting element and one of a pumping laser and an acousto-optic modulator and outputting the femtosecond laser optical comb; an optical mode extracting unit extracting a first optical mode and a second optical mode having different frequencies from the femtosecond laser optical comb; an injection locking unit injecting the first optical mode to a first slave laser to generate a first cw light and injecting the second optical mode to a second slave laser to generate a second cw light; and a controlling unit including a high-finesse cavity, generating a first optical comb control signal based on the first cw light and a resonance frequency of the high-finesse cavity to control the length adjusting element, and generating a second optical comb control signal based on the second cw light and a resonance frequency of the high-finesse cavity to control the pumping laser or the acousto-optic modulator included in the femtosecond laser light source.

The controlling unit may include: a modulating unit allowing the first cw light to be incident to a first modulator to generate a first modulated light in which a phase or a frequency of the first cw light is modulated and allowing the second cw light to be incident to a second modulator to generate a second modulated light in which a phase or a frequency of the second cw light is modulated; a standard unit including the high-finesse cavity and allowing the first modulated light and the second modulated light to be incident to the high-finesse cavity and be then reflected from or transmitted through the high-finesse cavity to generate a first standard light and a second standard light; a first optical comb controlling unit comparing the first standard light frequency and a driving signal frequency of the first modulator with each other to generate the first optical comb control signal; and a second optical comb controlling unit comparing the second standard light frequency and a driving signal frequency of the second modulator with each other to generate the second optical comb control signal, the first optical comb control signal may adjust the length adjusting element, and the second optical comb control signal may adjust the pumping laser or the acousto-optic modulator included in the femtosecond laser light source.

The standard unit may include: a multiplexer integrating optical paths with each other; the high-finesse cavity having certain resonance frequencies; and a demultiplexer splitting the optical paths from each other, the multiplexer may integrate the first modulated light and the second modulated light with each other to generate an overlapped light, the high-finesse cavity may reflect or transmit the overlapped light therefrom or therethrough to generate a standard light based on the resonance frequencies, and the demultiplexer may split the standard light to generate the first standard light and the second standard light.

The controlling unit may include: the first optical comb controlling unit including a photodetector, obtaining a first standard signal from the first standard light by using the photodetector, and comparing the first standard signal frequency with the driving signal frequency of the first modulator to generate the first optical comb control signal; and the second optical comb controlling unit including a photodetector, obtaining a second standard signal from the second standard light frequency by using the photodetector, and comparing the second standard signal frequency with the driving signal frequency of the second modulator to generate the second optical comb control signal.

The mode extracting unit may include one of a Bragg grating, a virtually imaged phased array (VIPA), an acousto-optic tunable filter, an interference filter, and a tunable Fabry-Perot interferometer.

The length adjusting element may include one of a piezoelectric actuator, a modulator, and a servomotor, and adjust a length of the femtosecond laser light source on the basis of the first optical comb control signal.

The pumping laser may adjust an output power of the pumping laser on the basis of the second optical comb control signal to adjust an optical path length.

The acousto-optic modulator driving signal frequency may be adjusted on the basis of the second optical comb control signal to adjust a phase of the femtosecond laser optical comb output from the femtosecond laser light source.

The device for performing overall frequency stabilization of a femtosecond laser optical comb by using optical modes directly extracted from the optical comb may further include an application unit receiving the femtosecond laser optical comb input from the femtosecond laser light source and outputting a cw light and a pulse, wherein the application unit may include an optical comb adjusting unit distributing the power of the femtosecond laser optical comb using an optical coupler, broadening the spectrum of the distributed femtosecond laser optical comb using a highly-nonlinear fiber, and/or amplifying the power output of the femtosecond laser optical comb of which the spectrum is broadened by using a fiber amplifier; and a cw light generating unit extracting and providing a cw light from the femtosecond laser optical comb output from the optical comb adjusting unit.

The fiber amplifier may be one of an erbium fiber amplifier, an ytterbium fiber amplifier, and a thulium fiber amplifier.

The application unit may further include a pulse generating unit outputting the femtosecond laser optical comb output by the optical comb adjusting unit as it is.

The first optical comb control signal may be one of a signal obtained by reflecting or transmitting the first cw light from or through the high-finesse cavity, a differentiated signal obtained from a signal obtained by reflecting or transmitting a first modulated light from or through the high-finesse cavity, a signal obtained by the Hansch-Couillaud method, a signal obtained by the Pound-Drever-Hall (PDH) method, and an error signal between the frequency of the first optical mode extracted from the femtosecond laser optical comb and a resonance frequency of the high-finesse cavity, and the second optical comb control signal may be one of a signal obtained by reflecting or transmitting the second cw light from or through the high-finesse cavity, a differentiated signal obtained from a signal obtained by reflecting or transmitting a second modulated light from or through the high-finesse cavity, a signal obtained by a Hansch-Couillaud method, a signal obtained by a PDH method, and an error signal between the frequency of the second optical mode extracted from the femtosecond laser optical comb and a resonance frequency of the high-finesse cavity.

In another general aspect, a method for performing overall frequency stabilization of a femtosecond laser optical comb by using optical modes directly extracted from the optical comb includes: (a) a step of outputting the femtosecond laser optical comb from a femtosecond laser light source including a length adjusting element adjusting a frequency of the optical comb by adjusting an actual length of the femtosecond laser light source and one of an acousto-optic modulator and a pumping laser adjusting a frequency of the optical comb by adjusting an optical path length of the femtosecond laser light source; (b) a step of extracting a first optical mode and a second optical mode having different frequencies from the optical comb; (c) a step of injecting the first optical mode to a first slave laser to generate a first cw light and injecting the second optical mode to a second slave laser to generate a second cw light; (d) a step of generating two optical comb control signals for controlling the femtosecond laser optical comb from the first cw light and the second cw light by using a high-finesse cavity; and (e) a step of stabilizing the overall femtosecond laser optical comb by controlling the length adjusting element and one of the pumping laser and the acousto-optic modulator on the basis of the two optical comb control signals.

The step (d) may include: (d1) a step of modulating a phase or a frequency of the first cw light to generate a first modulated light and modulating a phase or a frequency of the second cw light to generate a second modulated light; (d2) a step of introducing the first modulated light and the second modulated light into the high-finesse cavity to generate a first standard light and a second standard light; and (d3) a step of generating a first optical comb control signal on the basis of the first standard light and a driving signal of a first modulator and generating a second optical comb control signal on the basis of the second standard light and a driving signal of a second modulator.

The first optical comb control signal may be one of a signal obtained by reflecting or transmitting the first cw light from or through the high-finesse cavity, a differentiated signal obtained from a signal obtained by reflecting or transmitting a first modulated light from or through the high-finesse cavity, a signal obtained from the signal a signal obtained by a Hansch-Couillaud method, a signal obtained by a PDH method, and an error signal between the frequency of the first optical mode extracted from the femtosecond laser optical comb and a resonance frequency of the high-finesse cavity, and the second optical comb control signal may be one of a signal obtained by reflecting or transmitting the second cw light from or through the high-finesse cavity, a differentiated signal obtained from a signal obtained by reflecting or transmitting a second modulated light from or through the high-finesse cavity, a signal obtained by a Hansch-Couillaud method, a signal obtained by a PDH method, and an error signal between the frequency of the second optical mode extracted from the femtosecond laser optical comb and a resonance frequency of the high-finesse cavity.

Advantageous Effects

As described above, the device and the method for performing overall frequency stabilization of a femtosecond laser optical comb by using optical modes directly extracted from the optical comb capable of collectively stabilizing the optical frequencies of all the optical modes of the femtosecond laser optical comb by directly stabilizing the optical modes directly extracted from the optical comb to the high-finesse cavity or the absorption line of the optical atomic clock may be provided.

In addition, at least two different optical modes are extracted from the femtosecond laser optical comb, and a physical length and an optical path length of the femtosecond laser light source are controlled by using an error signal obtained through incidence of the extracted optical modes to the high-finesse cavity, thereby making it possible to stabilize the overall optical comb.

In addition, optical modes additionally extracted from the stabilized optical comb may generate a cw laser having an excellent linewidth, accuracy, and stability, such that the technology according to the present invention may be used as a basic technology of optical frequency generation. The cw laser obtained according to the present invention may be utilized in optical communication, precise spectroscopy, and optical metrology fields to have performance and economical efficiency.

BEST MODE

The present invention may be variously modified and have several exemplary embodiments. Therefore, specific exemplary embodiments of the present invention will be illustrated in the accompanying drawings and be described in detail. However, it is to be understood that the present invention is not limited to a specific exemplary embodiment, but includes all modifications, equivalents, and substitutions without departing from the scope and spirit of the present invention.

Hereinafter, a device for stabilizing an optical comb by using optical modes extracted from the optical comb according to the present invention will be described in detail with reference to the accompanying drawings.

The present applicant has found the fact that at least two different optical modes are extracted from a femtosecond laser optical comb to stabilize the optical comb as a result of performing a study for stabilizing a femtosecond laser optical comb without using a separate external cw laser and has completed the present invention by deepening the fact.

The present invention relates to a device and a method for stabilizing an overall range of frequencies of a femtosecond laser optical comb and generating a cw laser having an excellent stability and linewidth from the stabilized optical comb. In detail, the optical modes directly extracted from the optical comb are directly stabilized to the high-finesse cavity or an absorption line of an optical atomic clock to collectively stabilize optical frequencies of all the optical modes of the femtosecond laser optical comb.

A repetition rate ($f_r$) and a carrier-envelope offset frequency ($f_o$), which are two independent parameters of the femtosecond laser optical comb stabilized in the manner described above, may be determined on the basis of a first optical mode frequency ($f_1$) and a second optical mode frequency ($f_2$) extracted from the optical comb. That is, the first optical mode frequency generated by extracting an m-th optical mode from the femtosecond laser optical comb and the second optical mode frequency generated by extracting an n-th optical mode from the femtosecond laser optical comb are represented by functions of the repetition rate and the carrier-envelope offset frequency as follows.

$$f_1 = mf_r + f_o$$

$$f_2 = nf_r + f_o$$

Each of the first optical mode frequency and the second optical mode frequency is stabilized to the high-finesse cavity, such that the overall femtosecond laser optical comb may be stabilized. The repetition rate and the carrier-envelope offset frequency, which are the two independent parameters of the femtosecond laser optical comb stabilized in the manner described above, are determined as follows.

$$f_r = \frac{f_1 - f_2}{m - n}$$

$$f_o = \frac{mf_2 - nf_1}{m - n}$$

It may be appreciated from the above Equations that the repetition rate and the carrier-envelope offset frequency may be determined by two optical mode frequencies.

Figure 1:
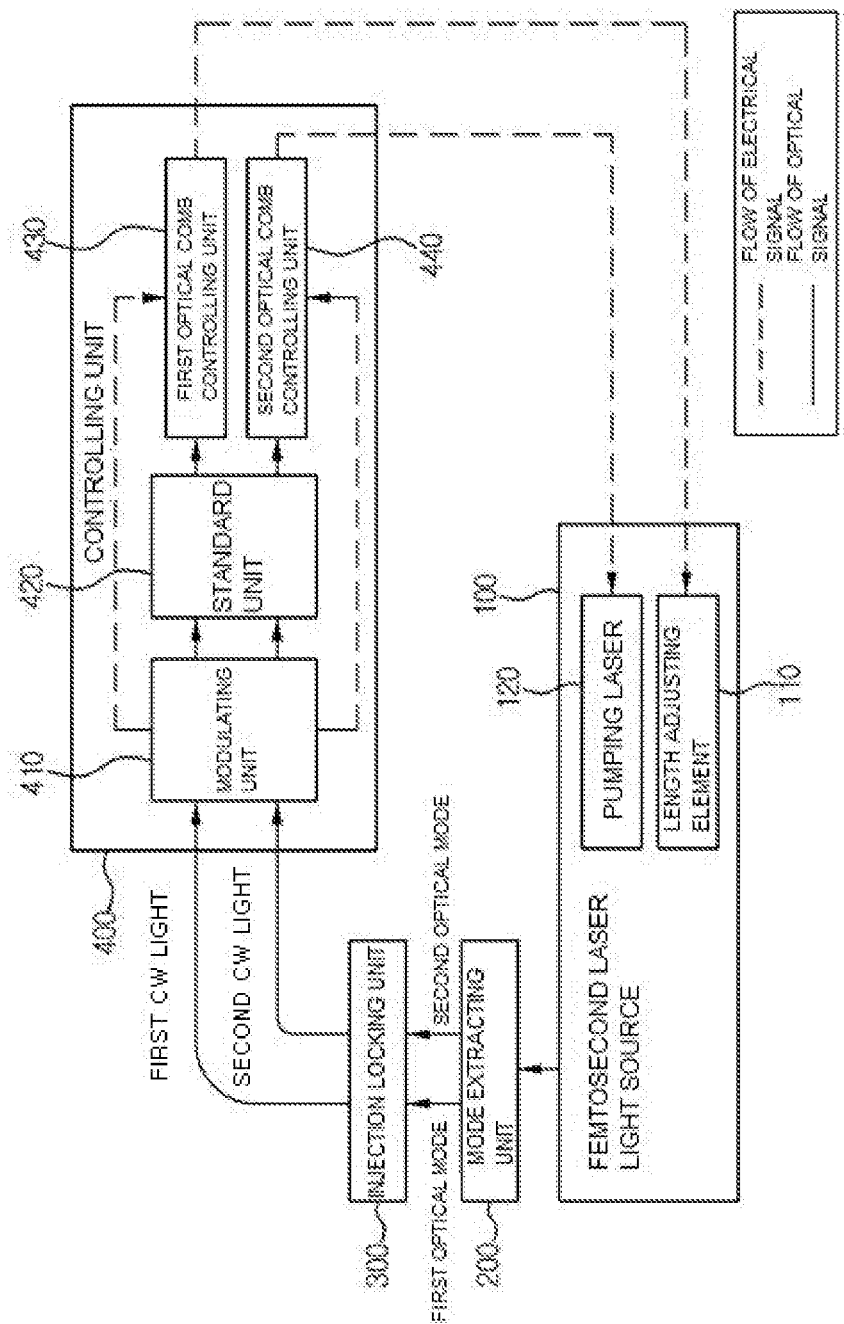
FIG. 1 is a block diagram illustrating a device for performing overall frequency stabilization of a femtosecond laser optical comb by using optical modes directly extracted from the optical comb according to an exemplary embodiment of the present invention.
Figure 2:
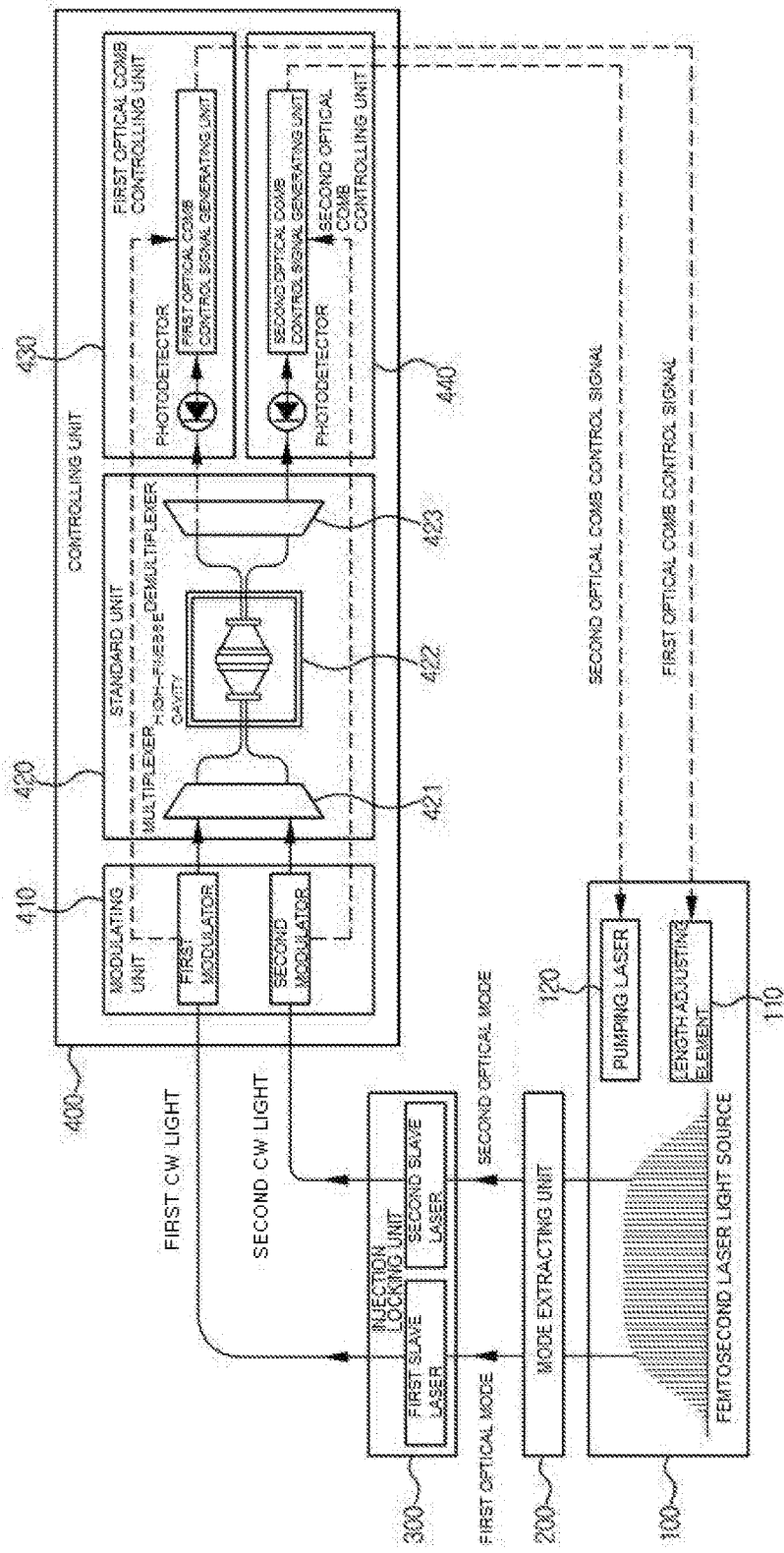
FIG. 2 is a view illustrating an optical configuration of the device for performing overall frequency stabilization of a femtosecond laser optical comb by using optical modes directly extracted from the optical comb according to an exemplary embodiment of the present invention.

FIG. 1 is a block diagram illustrating a device for performing overall frequency stabilization of a femtosecond laser optical comb by using optical modes directly extracted from the optical comb according to an exemplary embodiment of the present invention, and FIG. 2 is a view illustrating an optical configuration of the device for performing overall frequency stabilization of a femtosecond laser optical comb by using optical modes directly extracted from the optical comb according to an exemplary embodiment of the present invention. A first optical comb control signal and a second optical comb control signal are applied to a length adjusting element and a pumping laser, respectively, existing in a femtosecond laser light source in order to simultaneously adjust a geometric length and an optical path length of a femtosecond laser light source, such that stabilization of a frequency of an optical comb itself of a femtosecond laser is performed.

Referring to FIG. 1, a device for stabilizing an optical comb using optical modes extracted from the optical comb according to an exemplary embodiment of the present invention may include a femtosecond laser light source 100, a mode extracting unit 220, an injection locking unit 300, and a controlling unit 400. In addition, referring to FIGS. 1 and 2, a length adjusting element 110 and a pumping laser 120 in a resonator of the femtosecond laser light source may be used in order to control a frequency of the femtosecond laser optical comb.

The femtosecond laser light source 100 outputs the optical comb having a broad spectrum, and may include the length adjusting element 110 and the pumping laser 120. In order to control the frequency of the femtosecond laser optical comb, generally, a length of the resonator may be adjusted by using the length adjusting element such as a piezoelectric actuator, an electro-optic modulator, and a servomotor, and an optical path length of the resonator may be adjusted by adjusting strength of a current of the pumping laser. As another method for controlling the frequency of the femtosecond laser optical comb, an acousto-optic modulator 130 may be mounted at an output stage of the femtosecond laser optical comb, and a driving signal frequency, or the like, applied to the acousto-optic modulator may be adjusted.

The mode extracting unit 200 may extract a first optical mode and a second optical mode having different frequencies from the optical comb, and may be implemented by a Bragg grating, a virtually imaged phased array (VIPA), an acousto-optic tunable filter, an interference filter, a tunable Fabry-Perot interferometer, or a dielectric thin film filter. Since each of the optical modes of the optical comb is defined by the two independent parameters which are the repetition rate and the carrier-envelope offset frequency as described above, the mode extracting unit may extract at least two optical modes having different frequencies and introduce each of the extracted optical modes to a high-finesse cavity to obtain all information required for stabilizing an overall range of frequencies of the optical comb. In addition, when the mode extracting unit having different extracted frequency regions is used, any different optical frequencies in a wide frequency region of the optical comb may be simultaneously extracted.

The injection locking unit 300 may receive the first optical mode and the second optical mode input, and inject the first optical mode to a first slave laser in order to generate a first cw light and inject the second optical mode to a second slave laser in order to generate a second cw light. The generated first cw light and second cw light maintain frequency characteristics of the optical modes extracted from the optical comb, and power of the generated first cw light and second cw light are also amplified. The respective optical modes extracted from the optical comb may be directly injected to corresponding slave lasers through a circulator without being optically aligned or may be injected to the corresponding slave lasers through a combination of a quarter ($\lambda/4$) wave plate and a polarization beam splitter. As the first slave laser and the second slave laser, which are additional cw laser light sources, all of the solid, liquid, and gas lasers may be used, but semiconductor diode lasers may be mainly used. Since the first slave laser and the second slave laser used herein are used to be directly locked to an optical frequency standard or the high-finesse cavity, a separate external cw laser used in the related art is not required, such that a structure may be significantly simple.

The controlling unit 400 may generate a control signal for stabilizing the optical comb output from the femtosecond laser light source on the basis of the frequency response of the high finesse cavity in a standard unit 420 by frequency changes of the first cw light and the second cw light. The controlling unit 400 may include a modulating unit 410, the standard unit 420, a first optical comb controlling unit 430, and a second optical comb controlling unit 440.

The modulating unit 410 modulates a phase or a frequency of the first cw light input to the controlling unit to generate a first modulated light, and modulates a phase or a frequency of the second cw light input to the controlling unit to generate a second modulated light. In the modulating unit, modulators for generating each modulated light are required. To this end, modulators such as acousto-optic modulators, electro-optic modulators, or the like, may be used. In addition, driving signals of the modulators in the modulating unit may be controlled through sinusoidal signals generated by frequency generators (not illustrated) traced to a rubidium clock, a cesium clock, or a hydrogen major used as a radio frequency standard. The sinusoidal signals driving the modulators are transferred to the first optical comb controlling unit 430 and the second optical comb controlling unit 440 to contribute to generating the first optical comb control signal and the second optical comb control signal. In generating the first optical comb control signal and the second optical comb control signal, modulator driving signals in sinusoidal form traced to a stability of the radio frequency standard are used, and since common frequency noise existing in the sinusoidal signals driving the modulators and the first and second standard signals are removed while the sinusoidal signals are overlapped and synthesized with the first and second standard signals in mixers, frequency stability of the radio frequency standard and the frequency generators traced to the radio frequency standard do not have an influence on the finally generated optical comb control signals and the femtosecond laser optical comb stabilized by the optical comb control signals.

The standard unit 420 includes a high-finesse cavity 422. Therefore, the standard unit 420 receives the first modulated light and the second modulated light input, and generates a first standard light and a second standard light reflected from or transmitted through the high-finesse cavity. A multiplexer may be provided in order to input the modulated lights having different wavelengths to one high-finesse cavity, and a demultiplexer may be additionally provided at an output stage of the high-finesse cavity in order to split a modulated light output from the high-finesse cavity for each wavelength. Here, both of the multiplexer 421 and the demultiplexer 423 include an element combining and splitting two wavelengths with and from each other, and a wavelength division multiplexer (WDM), an arrayed waveguide grating (AWG), an optical add-drop multiplexer (OADM), a fiber Bragg grating (FBG), a circulator, a dielectric thin film filter, or the like, may be used. An optical atomic clock, absorption lines of atoms or molecules, or the like, may be used instead of the high-finesse cavity. Here, the high-finesse cavity may be formed of an ultra-low expansion material of which a length change depending on a temperature is very small, and may include a vacuum chamber for minimizing environment disturbance and a temperature and active vibration control system.

The first optical comb controlling unit includes a photodetector. Therefore, the first standard light, which is an optical signal, is input to the photodetector and is changed into a first standard signal, which is an electrical signal. The first standard signal and a driving signal of the first modulator may be compared with each other to generate the first optical comb control signal. The first optical comb controlling unit may be implemented by an electronic circuit including an RF oscillator, a frequency generator, a mixer, a low pass filter, and the like, so that the first standard light is completely locked to the high-finesse cavity positioned in the standard unit. The control of the frequency of the optical comb based on the first optical comb control signal is performed by adjusting the physical length of the resonator using the piezoelectric actuator, the electro-optic modulator, the servomotor, or the like, which is the length adjusting element in the resonator of the femtosecond laser light source.

The second optical comb controlling unit includes a photodetector. Therefore, the second standard light, which is an optical signal, is input to the photodetector and is changed into a second standard signal, which is an electrical signal. The second standard signal and a driving signal of the second modulator may be compared with each other to generate the second optical comb control signal. The second optical comb controlling unit may be implemented by an electronic circuit including an RF oscillator, a frequency generator, a mixer, a low pass filter, and the like, so that the second standard light is completely locked to the high-finesse cavity positioned in the modulating unit. The control of the frequency of the optical comb based on the second optical comb control signal is performed by adjusting the optical path length of the resonator through a control of an input current of the pumping laser existing in the resonator of the femtosecond laser light source.

The geometric length of the resonator and the optical path length of the resonator of the femtosecond light source are controlled through the first optical comb control signal and the second optical comb control signal respectively and simultaneously, to completely lock the first optical mode and the second optical mode extracted from the optical comb to the high-finesse cavity, thereby making it possible to collectively stabilize an overall range of frequency of the femtosecond laser optical comb.

Figure 3:
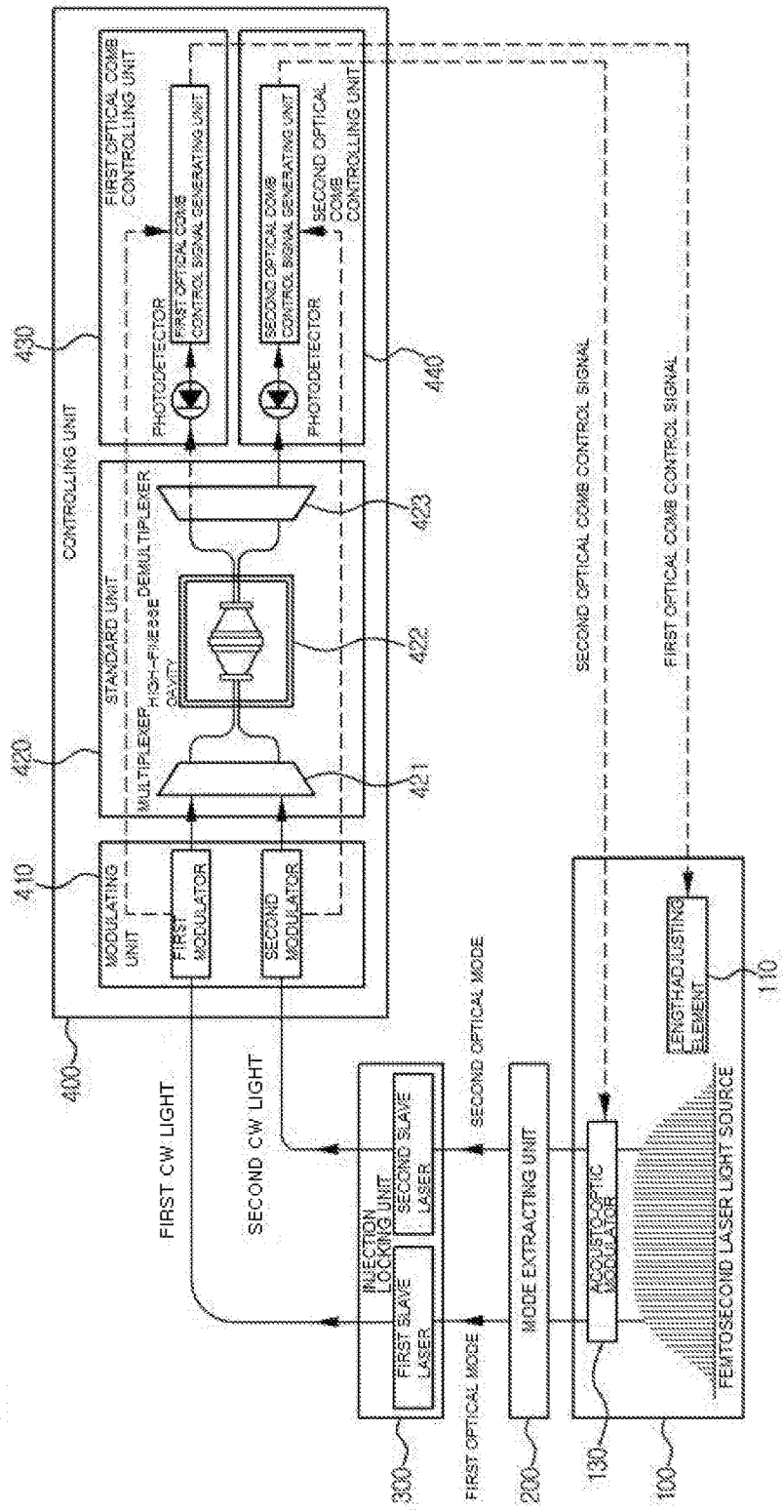
FIG. 3 is a view illustrating an optical configuration of a device for performing overall frequency stabilization of a femtosecond laser optical comb by using optical modes directly extracted from the optical comb according to another exemplary embodiment of the present invention.

In addition, the first optical comb control signal and the second optical comb control signal may be one of signals obtained by reflecting or transmitting the first cw light from or through the high-finesse cavity, differentiated signals obtained from the signals obtained by reflecting or transmitting a first modulated light from or through the high-finesse cavity using dithering, signals obtained by a Pound-Drever-Hall (PDH) method, signals obtained by a Hansch-Couillaud method, and error signals between the frequency of the optical mode extracted from the femtosecond laser optical comb and a resonance frequency of the high-finesse cavity. In FIG. 1, a manner of obtaining the error signals through the PDH method, which is one of the manners described above, is illustrated. FIG. 3 is a view illustrating an optical configuration of a device for performing overall frequency stabilization of a femtosecond laser optical comb by using optical modes directly extracted from the optical comb according to another exemplary embodiment of the present invention. Referring to FIG. 3, instead of adjusting a power of the pumping laser in a process of controlling a carrier-envelope offset frequency of the femtosecond laser optical comb, the acousto-optic modulator 130 is mounted at the output stage of the femtosecond laser optical comb, and the second optical comb control signal is applied to the acousto-optic modulator to generate a shift of an output frequency of the femtosecond laser optical comb.

Figure 4:
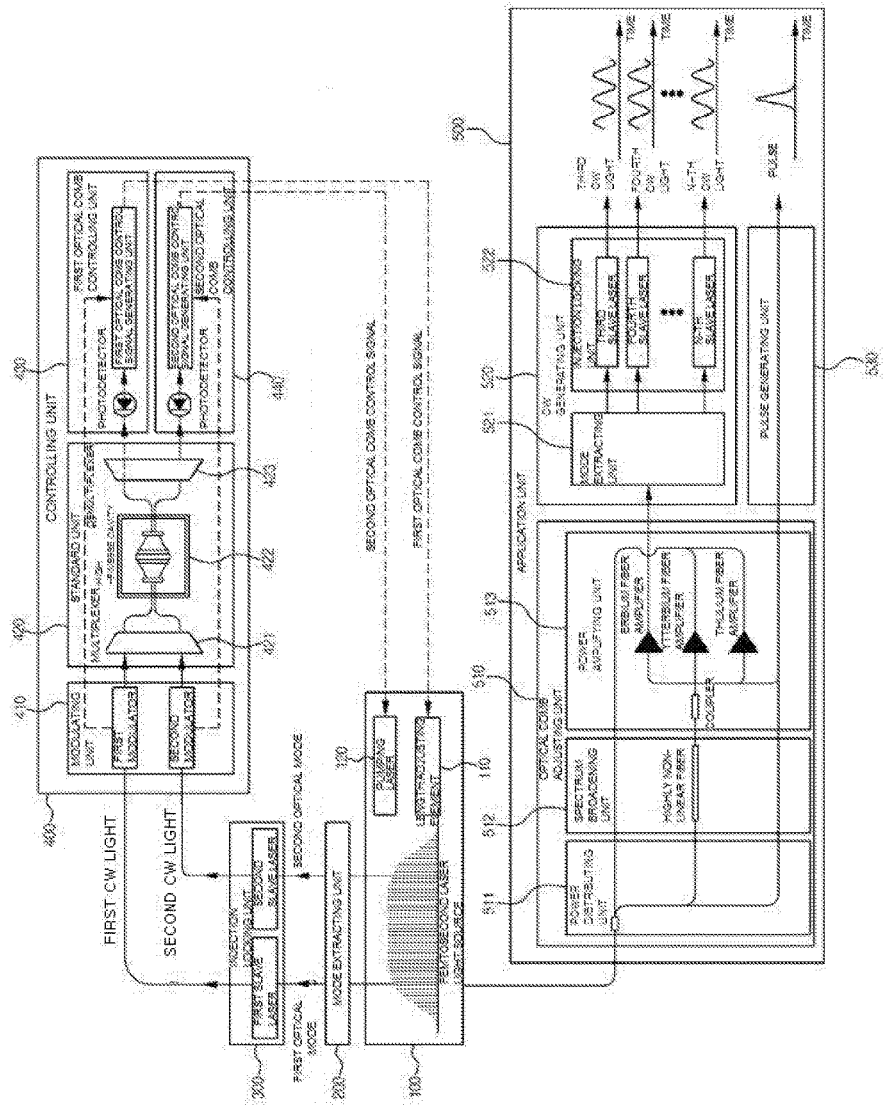
FIG. 4 is a view illustrating an optical configuration of an application unit generating a cw light and a pulse on the basis of a femtosecond laser optical comb stabilized through the device for performing overall frequency stabilization of a femtosecond laser optical comb by using optical modes directly extracted from the optical comb according to an exemplary embodiment of the present invention.

FIG. 4 is a view illustrating an optical configuration of an application unit generating a cw light and a pulse on the basis of a femtosecond laser optical comb stabilized through the device for performing overall frequency stabilization of a femtosecond laser optical comb by using optical modes directly extracted from the optical comb according to an exemplary embodiment of the present invention. The device for performing overall frequency stabilization of a femtosecond laser optical comb by using optical modes directly extracted from the optical comb according to an exemplary embodiment of the present invention may directly stabilize the femtosecond laser optical comb to the high-finesse cavity without introducing any separate external cw lasers, to use the stabilized optical comb itself as a light source (utilize a pulse laser) or generate any optical frequencies from the optical comb and utilize generated optical frequencies as a cw laser light source. Here, when injection locking is performed using lasers having different wavelengths, a plurality of optical modes having different frequencies may be simultaneously extracted or generated from the stabilized optical comb, and the generated respective different optical frequencies maintain frequency stability, accuracy, linewidth characteristics of the stabilized femtosecond laser optical comb. Therefore, the device for performing overall frequency stabilization of a femtosecond laser optical comb may be applied to various fields such as an optical clock, spectroscopy, optical communication, deep space exploration, optical metrology, and the like.

An application unit 500 may adjust the femtosecond laser optical comb stabilized through the device for stabilizing an optical comb using optical modes directly extracted from the optical comb according to an exemplary embodiment of the present invention, by an optical comb adjusting unit 510, and transfer the adjusted the optical comb to a cw light generating unit 520 and a pulse generating unit 530 to generate a cw light and a pulse laser required for various applications. The application unit 500 performing such a role may include both or one of the cw light generating unit 520 and the pulse generating unit 530.

The optical comb adjusting unit 510 may adjust a power and a spectrum of the stabilized femtosecond laser optical comb. The optical comb adjusting unit 510 may distribute the power depending on a required application field, broaden a spectrum, and compensate for powers of optical modes lowered by spectral broadening. The optical comb adjusting unit may include all or some of a power distributing unit 511, a spectrum broadening unit 512, and a power amplifying unit 513.

The power distributing unit 511 uses an optical coupler to distribute a portion of power required for an application field requiring a cw light source to the cw light generating unit 520 and distribute a portion of power required for an application field requiring a pulse laser to the pulse generating unit 530.

The spectrum broadening unit 512 may broaden an spectrum to several hundreds of THz or more by using a highly non-linear fiber provided in the spectrum broadening unit in the case in which the femtosecond laser optical comb may not directly provide a specific frequency required in the cw light generating unit.

The power amplifying unit 513 may compensate for low output powers of optical modes of the optical comb of which the spectrum is broadened. The power amplifying unit includes all of the elements amplifying light within different wavelength ranges required in the cw light generating unit, and an erbium fiber amplifier, an ytterbium fiber amplifier, a thulium fiber amplifier, and the like, to which a rare earth element (Er, Yb, Nd, or Tm) is added may be used. In addition, a semiconductor optical amplifier or a fiber Raman amplifier may be used in order to amplify the power.

The cw light generating unit may generate a cw light through a mode extracting unit 521 and an injection locking unit 522.

The mode extracting unit 521 may extract a single optical mode or multiple optical modes with different wavelengths required in the cw light generating unit from the femtosecond laser optical comb, and may be implemented by a Bragg grating, a virtually imaged phased array (VIPA), an acousto-optic tunable filter, an interference filter, a tunable Fabry-Perot interferometer, or a dielectric thin film filter.

The injection locking unit 522 injects the optical optical mode extracted by the mode extracting unit 521 to a slave laser to generate the cw light. A power of the generated cw light is amplified to a slave laser level while the generated cw light maintaining frequency characteristics of the optical mode extracted from the femtosecond laser optical comb. The respective extracted optical modes may be injected to slave lasers through a circulator without being optically aligned or may be injected to the slave lasers through a quarter ($\lambda/4$) wave plate and a polarization beam splitter. A master laser used in the injection locking unit may be an optical mode extracted from the optical comb, and a slave laser may be an additional free-running cw light source. As the slave laser, both of cw solid and gas lasers may be used, but a diode laser may be mainly used.

The pulse generating unit 530 may utilize the femtosecond laser light source itself as a pulse laser or utilize a femtosecond laser light source of a spectrum broadened through the spectrum broadening unit provided in the optical comb adjusting unit as a pulse laser.

Referring to FIG. 4, as a method for applying a femtosecond laser light source stabilized by the device for stabilizing an optical comb using optical modes extracted from the optical comb according to an exemplary embodiment of the present invention, there are mainly four methods: (1) a method for generating and applying a pulse by using an optical comb itself of a femtosecond laser, (2) a method for generating and applying a cw light source by extracting and amplifying any frequency in an optical comb, (3) a method for generating and applying a pulse having a broader frequency spectrum and a narrower pulse width by a spectral broadening of a femtosecond laser optical comb through a highly non-linear fiber, and (4) a method for generating and applying a cw light source by extracting and amplifying an optical mode with any frequency within the spectrum broadened through (3).

Figure 5:
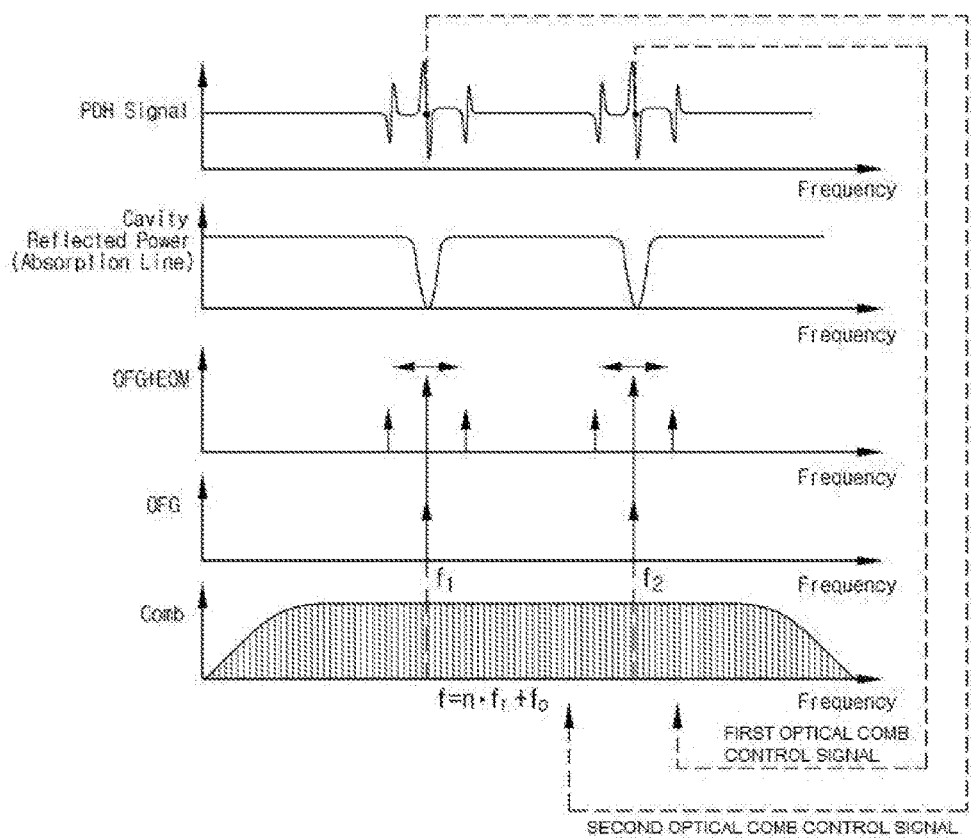
FIG. 5 is conceptual diagrams sequentially illustrating a method for stabilizing an optical comb through the device for performing overall frequency stabilization of a femtosecond laser optical comb by using optical modes directly extracted from the optical comb according to an exemplary embodiment of the present invention in a frequency domain.

FIG. 5 is conceptual diagrams sequentially illustrating a method for stabilizing an optical comb through the device for performing overall frequency stabilization of a femtosecond laser optical comb by using optical modes directly extracted from the optical comb according to an exemplary embodiment of the present invention in a frequency domain. In FIG. 5, a case of using the PDH method in obtaining the first optical comb control signal and the second optical comb control signal is assumed. The first optical comb control signal and the second optical comb control signal may be one of signals obtained by reflecting or transmitting the lights from or through the high finesse cavity, differentiated signals obtained from the signals obtained by reflecting or transmitting the lights from or through the high finesse cavity using dithering, signals obtained by a Hansch-Couillaud method, and error signals between the frequency of the optical mode extracted from the femtosecond laser optical comb and a resonance frequency of the high-finesse cavity, in addition to signals obtained through the PDH method.

A method for stabilizing a frequency of a femtosecond laser optical comb by using the device for performing overall frequency stabilization of a femtosecond laser optical comb by using optical modes directly extracted from the optical comb according to the present invention includes (a)

a step of outputting the femtosecond laser optical comb from a femtosecond laser light source including a length adjusting element adjusting the frequency of the optical comb by adjusting an actual length of the femtosecond laser light source and one of a an acousto-optic modulator and a pumping laser adjusting a frequency of the optical comb by adjusting an optical path length of the femtosecond laser light source, (b) a step of extracting a first optical mode and a second optical mode having different optical frequencies from the optical comb, (c) a step of injecting the first optical mode to a first slave laser to generate a first cw light and injecting the second optical mode to a second slave laser to generate a second cw light, (d) a step of generating two optical comb control signals for controlling the femtosecond laser optical comb from the first cw light and the second cw light by using a high-finesse cavity, and (e) a step of stabilizing the overall femtosecond laser optical comb by controlling the length adjusting element and one of the pumping laser and the acousto-optic modulator on the basis of the two optical comb control signals. Here, the step (d) may include (d1) a step of modulating a phase or a frequency of the first cw light to generate a first modulated light and modulating a phase or a frequency of the second cw light to generate a second modulated light, (d2) a step of introducing the first modulated light and the second modulated light into the high-finesse cavity to generate a first standard light and a second standard light, and (d3) a step of generating a first optical comb control signal on the basis of the first standard light and a driving signal of the first modulator and generating a second optical comb control signal on the basis of the second standard light and a driving signal of the second modulator. In the device for performing overall frequency stabilization of a femtosecond laser optical comb by using optical modes directly extracted from the optical comb according to an exemplary embodiment of the present invention, the number of required feedback circuits is less than that of a manner that is currently used, and any separate external narrow linewidth lasers are not required, such that an overall system is simple, and several different optical modes may be simultaneously stabilized to one high-finesse cavity. In addition, the stabilized optical comb may be used as the pulse and the cw light source, and in the case of the cw light source, any optical frequency may be selected from a broad optical frequency spectrum of the optical comb, and different optical frequencies may be simultaneously extracted and amplified to be usable as several cw light sources, such that an application field of the cw light source is wide.

The present invention is not limited to the abovementioned exemplary embodiments, but may be variously applied. In addition, the present invention may be variously modified by those skilled in the art to which the present invention pertains without departing from the gist of the present invention claimed in the claims.

DETAILED DESCRIPTION OF MAIN ELEMENTS

100: femtosecond laser light source
110: length adjusting element
120: pumping laser
130: acousto-optic modulator
200: mode extracting unit
300: injection locking unit
400: controlling unit
410: modulating unit
420: standard unit
421: multiplexer
422: high-finesse cavity
423: demultiplexer
430: first optical comb controlling unit
440: second optical comb controlling unit
500: application unit
510: optical comb adjusting unit
520: cw light generating unit
530: pulse generating unit
511: power distributing unit
512: spectrum broadening unit
513: power amplifying unit
521: mode extracting unit
522: injection locking unit

The invention claimed is:

1. A device for performing overall frequency stabilization of a femtosecond laser optical comb by using optical modes directly extracted from the optical comb, comprising:
a femtosecond laser light source including a length adjusting element and one of a pumping laser and an acousto-optic modulator and outputting the femtosecond laser optical comb;
an optical mode extracting unit extracting a first optical mode and a second optical mode having different frequencies from the femtosecond laser optical comb;
an injection locking unit injecting the first optical mode to a first slave laser to generate a first cw light and injecting the second optical mode to a second slave laser to generate a second cw light; and
a controlling unit including a high-finesse cavity, generating a first optical comb control signal based on the first cw light and a resonance frequency of the high-finesse cavity to control the length adjusting element, and generating a second optical comb control signal based on the second cw light and a resonance frequency of the high-finesse cavity to control the pumping laser or the acousto-optic modulator included in the femtosecond laser light source.

2. The device for performing overall frequency stabilization of a femtosecond laser optical comb by using optical modes directly extracted from the optical comb of claim 1, wherein the controlling unit includes:
a modulating unit allowing the first cw light to be incident to a first modulator to generate a first modulated light in which a phase or a frequency of the first cw light is modulated and allowing the second cw light to be incident to a second modulator to generate a second modulated light in which a phase or a frequency of the second cw light is modulated;
a standard unit including the high-finesse cavity and allowing the first modulated light and the second modulated light to be incident to the high-finesse cavity and be then reflected from or transmitted through the high-finesse cavity to generate a first standard light and a second standard light;
a first optical comb controlling unit comparing the first standard light frequency and a driving signal frequency of the first modulator with each other to generate the first optical comb control signal; and
a second optical comb controlling unit comparing the second standard light frequency and a driving signal frequency of the second modulator with each other to generate the second optical comb control signal,
the first optical comb control signal adjusts the length adjusting element, and the second optical comb control signal adjusts the pumping laser or the acousto-optic modulator included in the femtosecond laser light source.

3. The device for performing overall frequency stabilization of a femtosecond laser optical comb by using optical modes directly extracted from the optical comb of claim 2, wherein the standard unit includes:
   a multiplexer integrating optical paths with each other;
   the high-finesse cavity having certain resonance frequencies; and
   a demultiplexer splitting the optical paths from each other,
   the multiplexer integrates the first modulated light and the second modulated light with each other to generate an overlapped light,
   the high-finesse cavity reflects or transmits the overlapped light therefrom or therethrough to generate a standard light based on the resonance frequencies and
   the demultiplexer splits the standard light to generate the first standard light and the second standard light.

4. The device for performing overall frequency stabilization of a femtosecond laser optical comb by using optical modes directly extracted from the optical comb of claim 2, wherein the controlling unit includes:
   the first optical comb controlling unit including a photodetector, obtaining a first standard signal from the first standard light by using the photodetector, and comparing the first standard signal frequency with the driving signal frequency of the first modulator to generate the first optical comb control signal; and
   the second optical comb controlling unit including a photodetector, obtaining a second standard signal from the second standard light by using the photodetector, and comparing the second standard signal frequency with the driving signal frequency of the second modulator to generate the second optical comb control signal.

5. The device for performing overall frequency stabilization of a femtosecond laser optical comb by using optical modes directly extracted from the optical comb of claim 1, wherein the mode extracting unit includes one of a Bragg grating, a virtually imaged phased array (VIPA), an acousto-optic tunable filter, an interference filter, and a tunable Fabry-Perot interferometer.

6. The device for performing overall frequency stabilization of a femtosecond laser optical comb by using optical modes directly extracted from the optical comb of claim 1, wherein the length adjusting element includes one of a piezoelectric actuator, a modulator, and a servomotor, and adjust a length of the femtosecond laser light source on the basis of the first optical comb control signal.

7. The device for performing overall frequency stabilization of a femtosecond laser optical comb by using optical modes directly extracted from the optical comb of claim 1, wherein the pumping laser adjusts an output power of the pumping laser on the basis of the second optical comb control signal to adjust an optical path length.

8. The device for performing overall frequency stabilization of a femtosecond laser optical comb by using optical modes directly extracted from the optical comb of claim 1, wherein the acousto-optic modulator driving signal frequency may be adjusted on the basis of the second optical comb control signal to adjust a phase of the femtosecond laser optical comb output from the femtosecond laser light source.

9. The device for performing overall frequency stabilization of a femtosecond laser optical comb by using optical modes directly extracted from the optical comb of claim 1, further comprising an application unit receiving the femtosecond laser optical comb input from the femtosecond laser light source and outputting a cw light and a pulse, wherein the application unit includes:
   an optical comb adjusting unit distributing the power of the femtosecond laser optical comb using an optical coupler, broadening the spectrum of the distributed femtosecond laser optical comb using a highly-nonlinear fiber, and/or amplifying the power output of the femtosecond laser optical comb of which the spectrum is broadened by using a fiber amplifier; and
   a cw light generating unit extracting and providing a cw light from the femtosecond laser optical comb output from the optical comb adjusting unit.

10. The device for performing overall frequency stabilization of a femtosecond laser optical comb by using optical modes directly extracted from the optical comb of claim 9, wherein the fiber amplifier is one of an erbium fiber amplifier, an ytterbium fiber amplifier, and a thulium fiber amplifier.

11. The device for performing overall frequency stabilization of a femtosecond laser optical comb by using optical modes directly extracted from the optical comb of claim 9, wherein the application unit further includes a pulse generating unit outputting the femtosecond laser optical comb output by the optical comb adjusting unit as it is.

12. The device for performing overall frequency stabilization of a femtosecond laser optical comb by using optical modes directly extracted from the optical comb of claim 1, wherein the first optical comb control signal is one of a signal obtained by reflecting or transmitting the first cw light from or through the high-finesse cavity, a differentiated signal obtained from a signal obtained by reflecting or transmitting a first modulated light from or through the high-finesse cavity, a signal obtained by the Hansch-Couillaud method, a signal obtained by the Pound-Drever-Hall (PDH) method, and an error signal between the frequency of the first optical mode extracted from the femtosecond laser optical comb and a resonance frequency of the high-finesse cavity, and
   the second optical comb control signal is one of a signal obtained by reflecting or transmitting the second cw light from or through the high-finesse cavity, a differentiated signal obtained from a signal obtained by reflecting or transmitting a second modulated light from or through the high-finesse cavity, a signal obtained by the Hansch-Couillaud method, a signal obtained by the Pound-Drever-Hall (PDH) method, and an error signal between the frequency of the second optical mode extracted from the femtosecond laser optical comb and a resonance frequency of the high-finesse cavity.

13. A method for performing overall frequency stabilization of a femtosecond laser optical comb by using optical modes directly extracted from the optical comb, comprising:
   (a) a step of outputting the femtosecond laser optical comb from a femtosecond laser light source including a length adjusting element adjusting a frequency of the optical comb by adjusting an actual length of the femtosecond laser light source and one of an acousto-optic modulator and a pumping laser adjusting a frequency of the optical comb by adjusting an optical path length of the femtosecond laser light source;
   (b) a step of extracting a first optical mode and a second optical mode having different optical frequencies from the optical comb;

(c) a step of injecting the first optical mode to a first slave laser to generate a first cw light and injecting the second optical mode to a second slave laser to generate a second cw light;

(d) a step of generating two optical comb control signals for controlling the femtosecond laser optical comb from the first cw light and the second cw light by using a high-finesse cavity; and (e) a step of stabilizing the overall femtosecond laser optical comb by controlling the length adjusting element and one of the pumping laser and the acousto-optic modulator on the basis of the two optical comb control signals.

14. The method for performing overall frequency stabilization of a femtosecond laser optical comb by using optical modes directly extracted from the optical comb of claim 13, wherein step (d) includes:

(d1) a step of modulating a phase or a frequency of the first cw light to generate a first modulated light and modulating a phase or a frequency of the second cw light to generate a second modulated light;

(d2) a step of introducing the first modulated light and the second modulated light into the high-finesse cavity to generate a first standard light and a second standard light; and (d3) a step of generating a first optical comb control signal on the basis of the first standard light and a driving signal of a first modulator and generating a second optical comb control signal on the basis of the second standard light and a driving signal of a second modulator.

15. The method for performing overall frequency stabilization of a femtosecond laser optical comb by using optical modes directly extracted from the optical comb of claim 13, wherein the first optical comb control signal is one of a signal obtained by reflecting or transmitting the first cw light from or through the high-finesse cavity, a differentiated signal obtained from a signal obtained by reflecting or transmitting a first modulated light from or through the high-finesse cavity, a signal obtained by a Hansch-Couillaud method, a signal obtained by a PDH method, and an error signal between the frequency of the first optical mode extracted from the femtosecond laser optical comb and a resonance frequency of the high-finesse cavity, and the second optical control comb signal is one of a signal obtained by reflecting or transmitting the second cw light from or through the high-finesse cavity, a differentiated signal obtained from a signal obtained by reflecting or transmitting a second modulated light from or through the high-finesse cavity, a signal obtained by a Hansch-Couillaud method, a signal obtained by a PDH method, and an error signal between the frequency of the second optical mode extracted from the femtosecond laser optical comb and a resonance frequency of the high-finesse cavity.

* * * * *